United States Patent [19]

Kondo

[11] 4,449,092
[45] May 15, 1984

[54] CAPACITOR CHARGING CIRCUIT FOR DISCHARGE TYPE WELDING TOOL

[75] Inventor: Yoshiteru Kondo, Toyohashi, Japan

[73] Assignee: USM Corporation, Farmington, Conn.

[21] Appl. No.: 335,153

[22] Filed: Dec. 28, 1981

[30] Foreign Application Priority Data

Dec. 26, 1980 [JP] Japan .................. 55-188076

[51] Int. Cl.³ .............................................. G05F 1/46
[52] U.S. Cl. ................................... 323/271; 219/98; 219/113
[58] Field of Search ..................... 363/85, 86; 323/237, 323/271, 282, 300; 219/137 PS, 112, 113, 114, 98

[56] References Cited

U.S. PATENT DOCUMENTS

| | | | |
|---|---|---|---|
| 3,381,212 | 4/1968 | Peltola et al. .................. | 323/237 |
| 3,551,786 | 12/1970 | Van Gulik .................. | 363/86 |
| 3,909,694 | 9/1975 | Yokota et al. .................. | 219/98 |
| 4,153,872 | 5/1979 | Pomerantz .................. | 323/300 |

Primary Examiner—William M. Shoop
Assistant Examiner—Anita M. Ault
Attorney, Agent, or Firm—William F. White

[57] ABSTRACT

The present invention provides a capacitor charging circuit for a discharge type welding tool. The circuit includes a rectifier for producing rectified pulsating currents, a capacitor to be charged, a thyristor between the rectifier and the capacitor. A pulse generator receives the pulsating currents and in turn produces a pulse at each hill of the pulsating current. The thus produced pulse is applied to the gate of the thyristor which turns the thyristor on. A charge potential detecting circuit directly measures the charge potential across the charged capacitor and transfers a signal change, according to the level of the capacitor potential, to the pulse generator so as to thereby control the timing of the pulse generation at each hill of the pulsating current.

4 Claims, 1 Drawing Figure

CAPACITOR CHARGING CIRCUIT FOR DISCHARGE TYPE WELDING TOOL

FIELD OF THE INVENTION

The present invention relates to a capacitor charging circuit for a discharge type welding tool.

BACKGROUND OF THE INVENTION

In the prior art, in order to charge a capacitor of a discharge type welding tool, charge current is controlled by a resistor which produces undesired power consumption, and heats the internal portions of the tool which increases the temperature therein, resulting in undesired operation of circuits and damage to the circuit elements. When a high charge potential is required, charging time becomes long which in turn increases the working time. Excessive charging current flows at the initial stage of the charging to burn the electrical elements such as the power transfomer.

OBJECT OF THE INVENTION

It is an object of the invention to provide a circuit wherein the current controlling resistor is removed and a constant current is always supplied to the capacitor to be charged.

SUMMARY OF THE INVENTION

In order to attain the above object, the present invention provides a capacitor charging circuit for a discharge type welding tool. The circuit includes a rectifier for producing rectified pulsating currents, a capacitor to be charged, a thyristor between the rectifier and the capacitor. A pulse generator receives the pulsating currents and in turn produces a pulse at each hill of the pulsating current. The thus produced pulse is applied to the gate of the thyristor which turns the thyristor on. A charge potential detecting circuit directly measures the charge potential across the charged capacitor and transfers a signal change, according to the level of the capacitor potential, to the pulse generator so as to thereby control the timing of the pulse generation at each hill of the pulsating current. Such a construction requires only a thyristor in the charging current path with no need for a resistor, so that the disadvantages of a resistor are entirely eliminated.

In the embodiments of the invention, the pulse is produced at a position close to the end of each hill of the pulsating current when the potential across the capacitor is low. The pulse shifts toward the top of the current hill as the charge potential increases so that an excessive transient current flowing the capacitor is prevented. A photocoupler preferably interconnects the charge potential detecting circuit with the pulse generator to thereby electrically isolate the former from the latter.

DESCRIPTION OF THE PREFERRED EMBODIMENT

Figure 1:
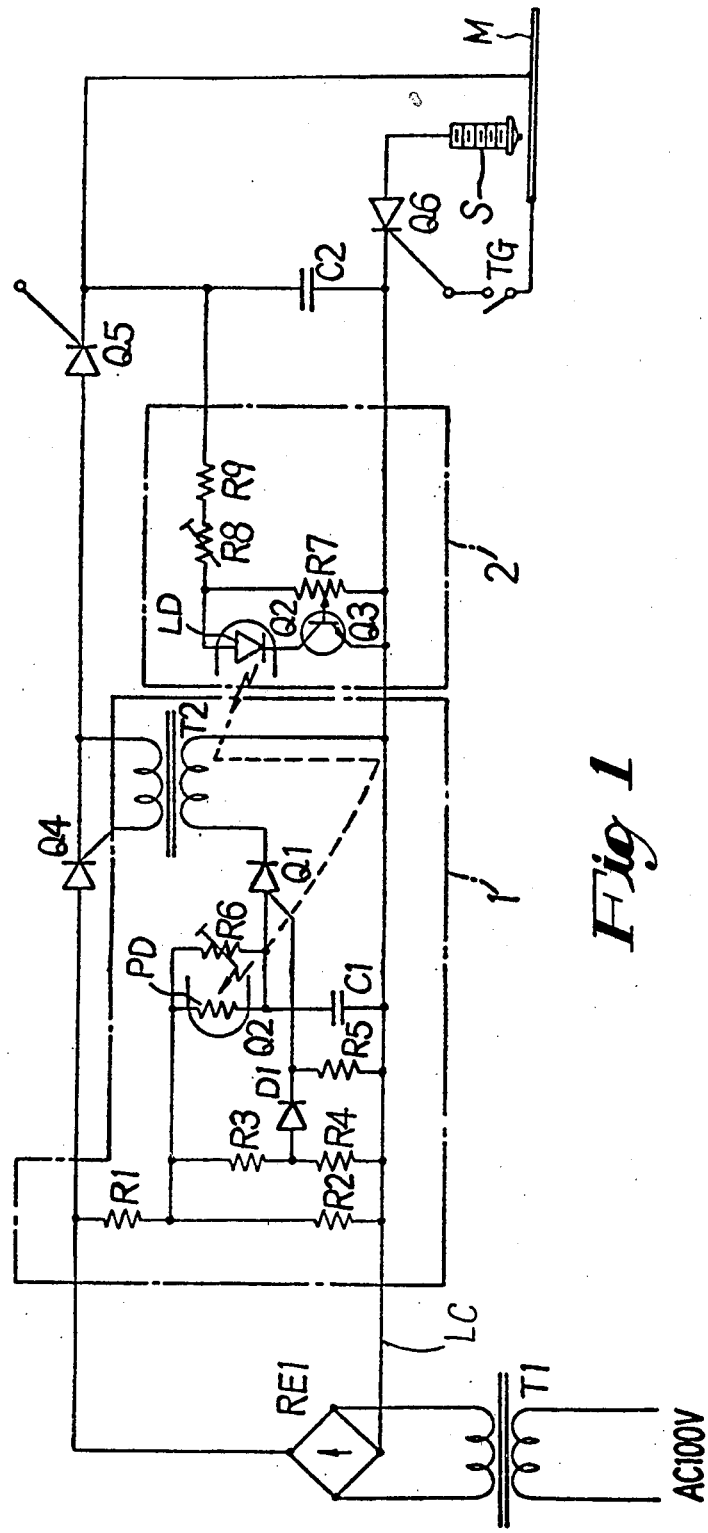
FIG. 1 illustrates the capacitor charging circuit according to the invention.

FIG. 1 shows a circuit for a discharge type welding tool in which a commercially available electric source of 100 V AC is applied to a power transformer T1. A secondary winding of the transformer T1 is connected to a full wave rectifying circuit RE1 which produces rectified pulsating currents of a single polarity. The pulsating currents travel through a phase controlling thyristor Q4 and a thyristor Q5 before being applied to a capacitor C2 which is to be charged. The thyristor Q5 prevents excessive charging after the capacitor C2 has been fully charged. It is to be understood that the thyristor Q5 may not always be required. A thyristor Q6 is interconnected between one end of the capacitor C2 and a bolt or stud S that is to be welded to a base material M. The other end of the capacitor C2 is connected to the base material M which may, for example, be sheet metal. A trigger TG of a welding tool turns on the thyristor Q6 causing the stud S to be welded to the base material M.

A pair of circuits labeled 1 and 2 appear within dotted outlines in FIG. 1. The circuit 1 generates control pulses which control the conduction timing of the phase control thyristor Q4. The circuit 2 detects and measures the charge potential of the capacitor C2. The circuit 2 controls the timing of the pulse generation by the pulse generator circuit 1 in accordance with the detected potential level. Photocoupler Q2 transfers a signal from a light emitting element LD in the circuit 1 to a light receiving element PD in the circuit 2.

The pulsating voltage from the rectifying circuit RE1 is applied to the pulse generator circuit 1 as shown. This voltage is first divided by resistors R1 and R2 with a further voltage division being made by resistors R3 and R4. This results in a prescribed voltage being applied to a diode D1. The output current of the diode D1 is applied to a gate of an N-gate thryristor Q1. A resistor R5 references the output voltage of the diode D1 relative to a common line LC so as to protect the thyristor Q1. Another voltage resulting from the division by the resistors R1 and R2 is applied to the light receiving element PD of the photocoupler Q2. This voltage is also applied to a variable resistor R6 upstream of the anode of the N-gate thyristor Q1. The capacitor C1 is charged by the currents flowing through the light receiving element PD and the variable resistor R6. The internal resistance of the light receiving element PD remains very high when the light emitting element LD is not actuated, so that most of the current flows through the variable resistor R6 to the capacitor C1. When the light emitting element is energized, the internal resistance of the light receiving element is decreased, so that current passes not only through the resistor R6 but also through the light receiving element PD so as to rapdily charge the capacitor C1.

Voltage applied to the capacitor has a pulsating wave form consisting of a series of hills. Upon studying the charging of the capacitor C1 within a half cycle (180°) or a single hill of the A.C. voltage applied to the transformer T1, it is seen that charging starts from a point of zero degrees phase and continues until the charging potential exceeds the gate voltage of the N-gate thyristor Q1. Just above the gate voltage, the thyristor A1 is instantaneously turned on so as to discharge the charged capacitor C1. The charging potential, however, cannot exceed the gate voltage when the phase is less than 90°. A pulsating voltage is applied to the gate of the thyristor Q1 so as to increase the potential level until the phase of 90°. The resistance of the parallel-arranged resistors R6 and PD and the capacitance of the capacitor C1 are properly selected to accomplish the above. The resistance of the variable resistor R6 is selected so that the charging potential of the capacitor C1 cannot exceed the gate voltage until approximately a phase of 180°. At this time, the parallel resistors have the highest resistance, that is, the light receiving element LD of the photocoupler Q2 does not receive any light. The N-gate thyristor Q1 conducts only during the discharging of the capacitor C1 so as to generate a pulse. The thus generated pulse is applied to a pulse transformer T2. It is to be appreciated that the frequency of the generated pulses is the same as the frequency of the power source.

The secondary winding of the pulse transformer T2 has one end connected to the gate of the phase control thyristor Q4 and the other end connected to the cathode of the thyristor Q4, so that, when the pulse is applied form the transformer T2, the thyristor Q4 is turned on. The voltage applied to the anode of the thyristor Q4 has a pulsating wave form resulting from the full wave rectification by RE1. The level of the anode voltage becomes zero volts at each half cycle, namely, hill, so that the thyristor is turned off at the end of each half cycle (a single hill). As mentioned above, the control pulse generator circuit 1, however, generates one pulse in each half cycle, and therefore the thyristor Q4 periodically takes the conduction and non-conduction states in each half cycle.

Conduction of the phase control thrysitor Q4 causes the capacitor C2 to become charged. The potential of the charged capacitor is measured by detecting circuit 2 as will hereinafter be described. The voltage of the capacitor C2 is applied to a resistance network comprising a resistor R9, a variable resistor R8 and a potentiometer R7. Light emitting element LD of the photocoupler Q2 and a transistor Q3 are connected in series between both ends of the potentiometer R7. The base of the transistor Q3 is connected to a center tap of the potentiometer R7. Thus, the transistor Q3 serves as a variable resistor which varies with the potential developed at the center tap of the potentiometer R7. If the collector-emitter resistance of the transistor Q3 becomes low, the light emitting element LD illuminates the light receiving element PD so as to decrease the internal resistance thereof. Alternatively, when the resistance of the transistor Q3 becomes higher, the element LD is de-energized to emit less light so as to thereby increase the resistance of the element PD. The resistance of the variable resistor R8 and the position of the center tap of the potentiometer R7 are adjusted so that the amount of light emitted by the element LD is sufficient to effectively vary the internal resistance of the transistor Q3.

At the initial charging stage, the potential of the capacitor C2 is zero volts, so that no current flows through the light emitting element LD and hence no illumination occurs. Thus, the light receiving element PD of the photocoupler Q2 in the control pulse generator circuit 1 has a very high resistance. The charging of the capacitor C1 is, therefore, slowly effected via the current flowing through the variable resistor R6. As mentioned above, the variable resistor R6 is so adjusted that the charge potential of the capacitor C1 exceeds the gate voltage of the Ngate thyristor Q1 at a position close to the end (180°) of each hill (half cycle) of the pulsating current. Therefore, the control pulse is generated close to but not at the 180° phase so as to turn on the phase control thyristor Q4. As the pulsating voltage is applied to the thyristor Q4, the same is turned off at the end (180°) of the hill. Such a condition is repeated at each half cycle (each hill). Accordingly, only a small current flows to the charge capacitor C1. This is very advantageous. In the prior art, a very large current is required when the capacitor C2 has no charge, resulting in the need for a large power source capacity. However, the present invention makes the capacity thereof smaller since only a small current is required. Further at the initiation of charging, there is no adverse effect due to large transient current flows in other circuit portions. In the present invention, even if serious damage such as shortening of the capacitor C2 occurs, the thyristor Q4 is actuated so as to prevent excessive current flowing to the circuit.

As the charging continues, the charge potential of the capacitor C2 is increased so as to decrease the collector-emitter resistance of the transistor Q3 in the detecting circuit 2. This causes current to flow in the light emitting element LD of the photocoupler Q2. Thus, the resistance of the light receiving element PD of the photocoupler Q2 in the pulse generator circuit 1 is decreased so as to shorten the charge period of the capacitor C1. Therefore, in each hill (half cycle) of the pulsating current, the turn-on timing of the N-gate thyristor Q1 is shifted from the phase of 180° (the end of the hill) to the phase of 90° (the crest of the hill). In other words, the timing of generation of the pulse from the pulse transformer T2 becomes gradually earlier in accordance with the charge potential of the capacitor C2 to retain the potential difference applied from the thyristor Q4 to the capacitor C2 at a constant level. Thus, the level of the voltage passing through the thyristor Q4 becomes gradually higher at the respective half-cycles while the amount of current is maintained at a constant level.

In accordance with the present invention, any current control resistor is removed to avoid undesired internal power consumption. Heating of the welding tool is also eliminated which prevents the temperature of the tool from rising. There is no voltage drop because of the lack of a resistor. Charging currents can be increased as the charged potential becomes higher to make the charging time period shorter. Further, a small amount of the charging current is required at the initial stage to relieve the work load in the power circuit.

What is claimed is:

1. A capacitor charging circuit for a discharge type welding tool wherein a capacitor is charged with rectified pulsating currents through a thyristor to effect discharge-welding by the electric energy stored in the capacitor, said circuit comprising a rectifier for producing said rectified pulsating currents; a capacitor to be charged; a thyristor between said rectifier and said capacitor; a pulse generator connected to receive said pulsating currents, said pulse generator producing a pulse at each hill of the pulsating current, the pulse being applied to the gate of said thyristor to turn the thyristor on at each hill of said pulsating current, said pulse generator comprising a pair of resistance elements connected in parallel to a second capacitor which is charged in response to the electrical current in the pair of resistance elements, and means for discharging said second capacitor when said second capacitor exceeds a predefined voltage so as to produce the pulse applied to said thyristor; and a charge potential detecting circuit arranged to directly measure the charge potential across said charged capacitor so as to transfer a signal, changed according to the level of the capacitor potential, to said pulse generator thereby to control the timing of the pulse generation at each hill of said pulsating current.

2. The circuit of claim 1 wherein said pulse is produced at a position close to the end of each hill of said pulsating current when the potential across said capacitor is low, and said pulse is shifted toward the hill top of said current as the charge potential becomes increased.

3. The circuit of claim 2 wherein said charge potential detecting circuit comprises a light emitting element increasing the amount of light in accordance with the increased charge potential, and said pulse generator comprises a light receiving element for receiving the light from said light emitting element, said elements being composed of a photocoupler.

4. The circuit of claim 1 wherein said charge potential detecting circuit comprises a light emitting element increasing the amount of light in accordance with the increased charge potential, and one of said pair of resistance elements in said pulse generator comprises a light receiving element for receiving the light from said light emitting element so as to become increasingly conductive of electrical current in response to the amount of light from the light emitting element so as to thereby charge said second capacitor at a rate dependent on the amount of light from said light emitting element.

* * * * *